(12) United States Patent
Yearick (10) Patent No.: US 10,458,144 B1
(45) Date of Patent: Oct. 29, 2019

(54) SOLAR GRAVESTONE DISPLAY (71) Applicant: Dale Yearick, Naples, FL (US)

(72) Inventor: Dale Yearick, Naples, FL (US)

( * ) Notice: Subject to any disclaimer, the term of this patent is extended or adjusted under 35 U.S.C. 154(b) by 0 days.

(21) Appl. No.: 16/140,610

(22) Filed: Sep. 25, 2018

(51) Int. Cl.
*E04H 13/00* (2006.01)
*H02S 40/38* (2014.01)
*G06F 1/3231* (2019.01)

(52) U.S. Cl.
CPC .......... *E04H 13/003* (2013.01); *H02S 40/38* (2014.12); *G06F 1/3231* (2013.01)

(58) Field of Classification Search
CPC .............................. E04H 13/003; G06F 1/3231
See application file for complete search history.

(56) References Cited

U.S. PATENT DOCUMENTS

| | | | |
|---|---|---|---|
| 4,304,076 A | 12/1981 | Splendora | |
| 5,404,343 A * | 4/1995 | Boggio | E04H 13/003 360/12 |
| 5,696,488 A * | 12/1997 | Assisi | G07C 9/00111 235/375 |
| 6,414,663 B1 | 7/2002 | Manross, Jr. | |
| 6,980,107 B1 | 12/2005 | Ziegler | |
| 7,089,495 B2 | 8/2006 | Barrows | |
| 7,609,506 B2 | 10/2009 | Aguirre | |
| 7,665,881 B2 * | 2/2010 | Elam | E04H 13/003 27/1 |
| 8,068,035 B1 * | 11/2011 | Salcedo | E04H 13/003 320/101 |
| D683,105 S | 5/2013 | Victor | |
| 10,233,663 B1 * | 3/2019 | Grupp | E04H 13/003 |
| 10,372,162 B1 * | 8/2019 | Beaulieu | G06F 1/1637 |
| 2001/0036354 A1 | 11/2001 | Majors | |
| 2004/0085337 A1 * | 5/2004 | Barrows | E04H 13/003 715/717 |
| 2005/0268235 A1 * | 12/2005 | Stone | E04H 13/003 715/716 |
| 2010/0158478 A1 * | 6/2010 | Gomez, Jr. | E04H 13/003 386/291 |
| 2010/0307037 A1 | 12/2010 | Chi | |
| 2015/0252583 A1 * | 9/2015 | Dvorak | E04H 13/006 52/103 |
| 2016/0002948 A1 * | 1/2016 | Galarza | E04H 13/003 386/230 |

(Continued)

FOREIGN PATENT DOCUMENTS

WO   WO-2004040547 A1 *   5/2004   ........... E04H 13/003

*Primary Examiner* — Rodney Mintz (57) ABSTRACT

The solar gravestone display is a funerary structure. The solar gravestone display is a reliquary that stores and displays one or more relics associated with a person. The solar gravestone display comprises a memorial structure and an epitaph device. The memorial structure forms a tombstone for the funerary structure. The memorial structure houses the reliquary of the solar gravestone display. The epitaph device is an electric circuit. The epitaph device: a) detects the presence of a visitor to the site; b) illuminates relics contained within the reliquary; c) initiates an audible presentation appropriate for the function performed by the funerary structure; d) extinguishes the illumination of the reliquary after a predetermined period; and, e) terminates the audible presentation after the predetermined amount of time. The audible presentation is selected from the group consisting of an encomium or music.

14 Claims, 4 Drawing Sheets

(56) References Cited

U.S. PATENT DOCUMENTS

2017/0041584 A1* 2/2017 Jones ............... E04H 13/003
2018/0035094 A1* 2/2018 Evans ............... G06F 1/3231
2018/0100324 A1* 4/2018 McFee ............. E04H 13/003

* cited by examiner

SOLAR GRAVESTONE DISPLAY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of buildings and monuments including tombs and burial vaults, more specifically, a gravesite marker that does not make a part of the vault. (E04H13/003)

SUMMARY OF INVENTION

The solar gravestone display is a funerary structure. The solar gravestone display is a reliquary that stores and displays one or more relics associated with a person. The solar gravestone display comprises a memorial structure and an epitaph device. The memorial structure forms a tombstone for the funerary structure. The memorial structure houses the reliquary of the solar gravestone display. The epitaph device is an electric circuit. The epitaph device: a) detects the presence of a visitor to the site; b) illuminates relics contained within the reliquary; c) initiates an audible presentation appropriate for the function performed by the funerary structure; d) extinguishes the illumination of the reliquary after a predetermined period; and, e) terminates the audible presentation after the predetermined amount of time. The audible presentation is selected from the group consisting of an encomium or music.

These together with additional objects, features and advantages of the solar gravestone display will be readily apparent to those of ordinary skill in the art upon reading the following detailed description of the presently preferred, but nonetheless illustrative, embodiments when taken in conjunction with the accompanying drawings.

In this respect, before explaining the current embodiments of the solar gravestone display in detail, it is to be understood that the solar gravestone display is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the solar gravestone display.

It is therefore important that the claims be regarded as including such equivalent construction insofar as they do not depart from the spirit and scope of the solar gravestone display. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
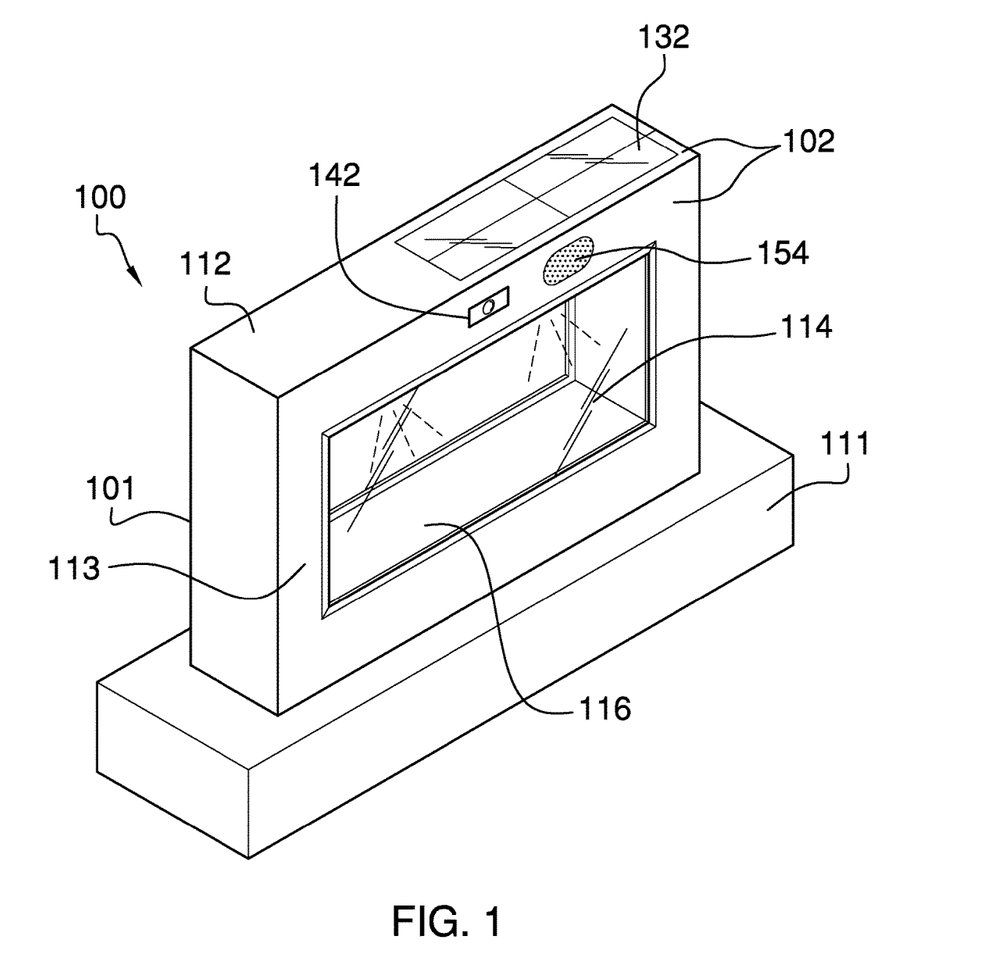
FIG. 1 is a perspective view of an embodiment of the disclosure.
Figure 2:
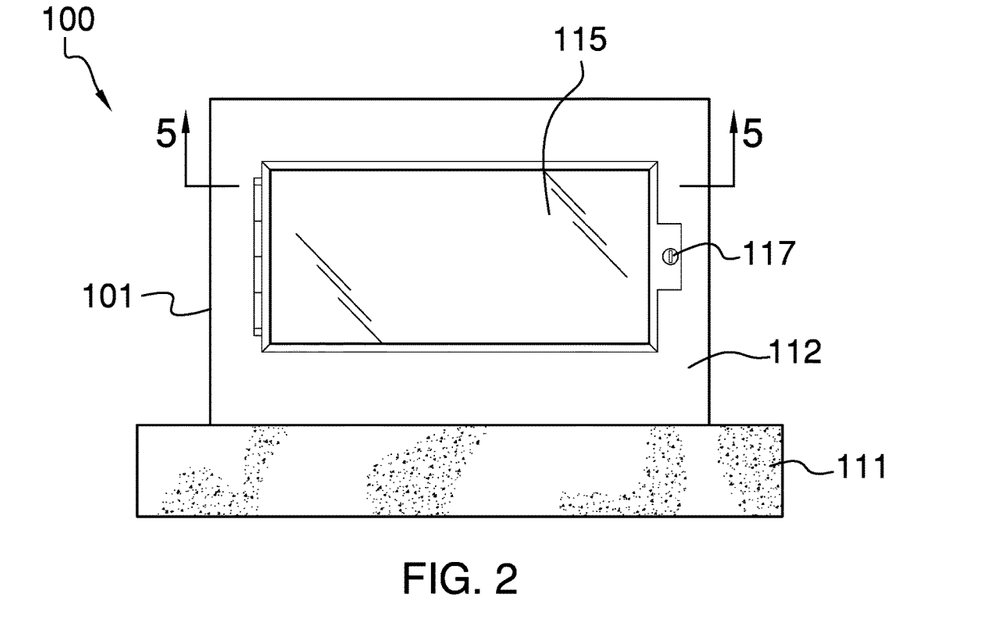
FIG. 2 is a rear view of an embodiment of the disclosure.
Figure 3:
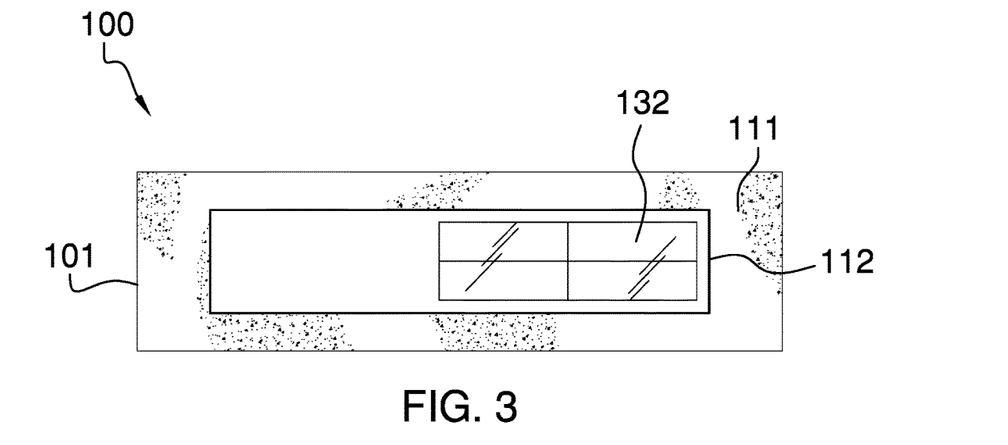
FIG. 3 is a top view of an embodiment of the disclosure.
Figure 4:
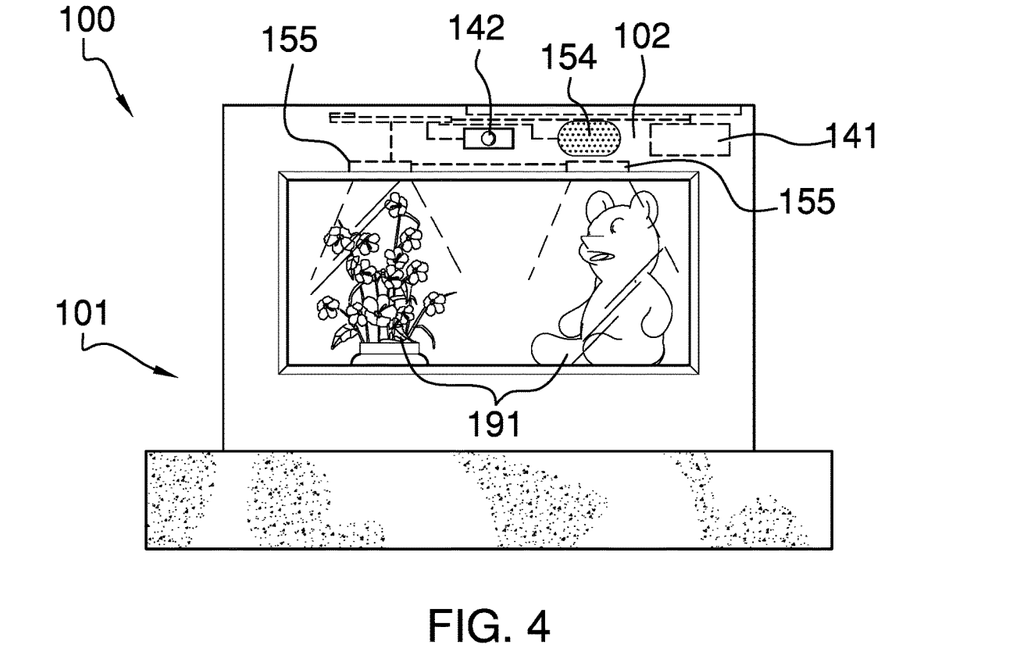
FIG. 4 is an in-use view of an embodiment of the disclosure.
Figure 5:
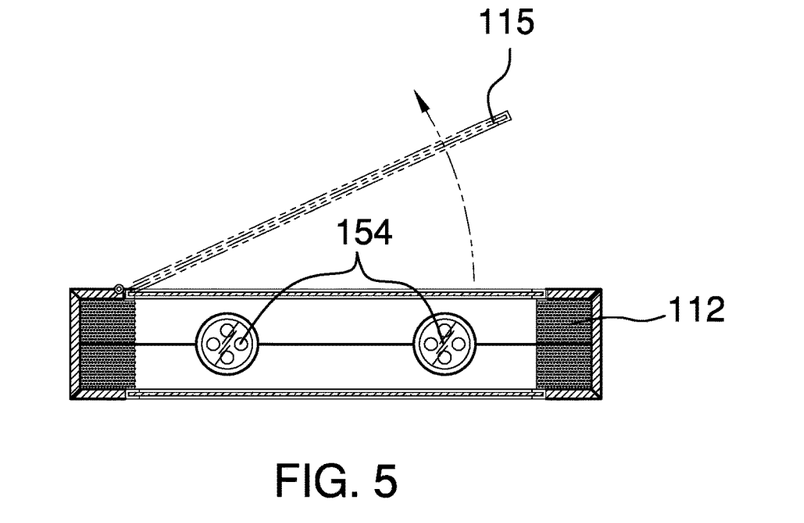
FIG. 5 is a cross-sectional view of an embodiment of the disclosure across 5-5 as shown in FIG. 3.
Figure 6:
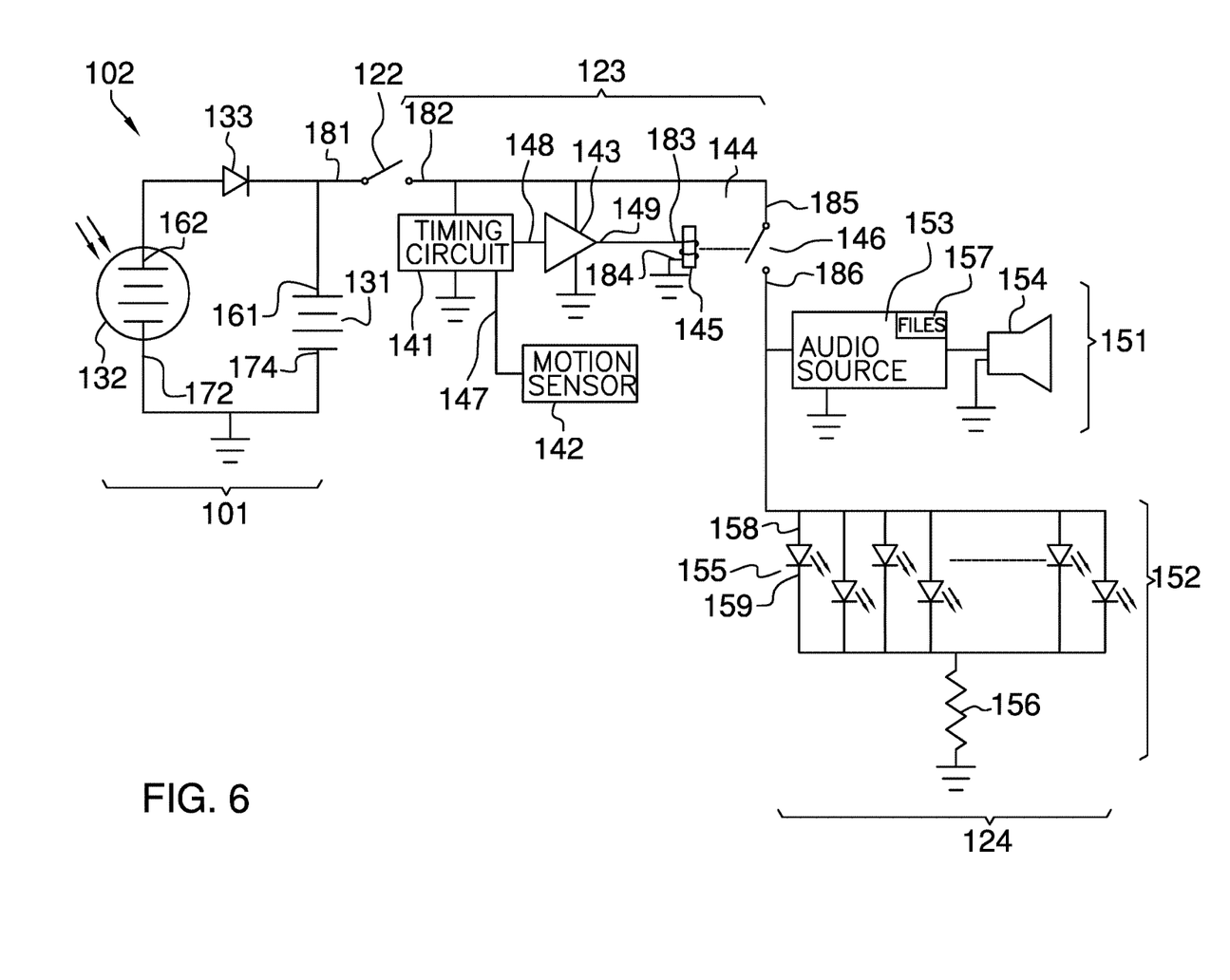
FIG. 6 is a schematic view of an embodiment of the disclosure.

Detailed reference will now be made to one or more potential embodiments of the disclosure, which are illustrated in FIGS. 1 through 6.

The solar gravestone display 100 (hereinafter invention) is a funerary structure. The invention 100 contains a reliquary 113 that stores and displays one or more relics 191 associated with a person. The invention 100 comprises a memorial structure 101 and an epitaph device 102. The memorial structure 101 forms a tombstone for the funerary structure. The memorial structure 101 houses the reliquary 113 of the invention 100. The epitaph device 102 is an electric circuit. The epitaph device 102: a) detects the presence of a visitor to the site; b) illuminates the one or more relics 191 contained within the reliquary 113; c) initiates an audible presentation appropriate for the function performed by the funerary structure; d) extinguishes the illumination of the reliquary 113 after a predetermined period; and, e) terminates the audible presentation after the predetermined amount of time. The audible presentation is selected from the group consisting of an encomium or music.

The memorial structure 101 is a funerary structure modeled on a traditional structure known as a tombstone. The memorial structure 101 contains the epitaph device 102. The memorial structure 101 forms the exterior structure of the reliquary 113 formed by the invention 100. The memorial structure 101 comprises a pedestal 111 and a headstone 112.

The pedestal 111 is a prism-shaped structure. The pedestal 111 forms a load path between the headstone 112 and the ground supporting the invention 100. The pedestal 111 forms a platform that raises the headstone 112 above the ground.

The headstone 112 is a hollow prism-shaped structure. The headstone 112 resets on the pedestal 111 such that the pedestal 111 and the headstone 112 forms a composite prism. The headstone 112 is the structure of the memorial structure 101 that contains the epitaph device 102. The headstone 112 further comprises a reliquary 113, a transparent barrier 114, and a door 115.

The reliquary 113 is a display space formed within the headstone 112. The reliquary 113 is a chamber that contains the one or more relics 191 for display. The headstone 112 contains the reliquary 113. The interior of the reliquary 113 is visible from the exterior of the headstone 112. The reliquary 113 further comprises a reliquary 113 cavity 116. The reliquary 113 cavity 116 refers to the negative space formed within the headstone 112 that forms the display space of the reliquary 113. The reliquary 113 cavity 116 is a prism-shaped structure.

The transparent barrier 114 is a window formed through the headstone 112 such that the reliquary 113 is viewable from the exterior of the headstone 112. The transparent barrier 114 forms a gas impermeable barrier between the exterior of the headstone 112 and the reliquary 113.

The door 115 is a rotating or removable barrier that encloses the reliquary 113 cavity 116. The door 115 controls access into the reliquary 113 cavity 116 such that the one or more relics 191 can be introduced into and removed from the reliquary 113 as desired. Methods to enclose a chamber using a door 115 are well-known and documented in the mechanical arts. The door 115 further comprises a lock 117. The lock 117 is a mechanical device used to secure the door 115 in a closed position.

The epitaph device 102 is an electrical circuit. The epitaph device 102: a) detects the presence of a visitor to the site; b) illuminates the one or more relics 191 contained within the reliquary 113; c) initiates an audible presentation appropriate for the function performed by the funerary structure; d) extinguishes the illumination of the reliquary 113 after a predetermined period; and, e) terminates the audible presentation after the predetermined amount of time. The epitaph device 102 comprises a power circuit 121, a master switch 122, a timing device 123, and a reliquary 113 circuit 124.

The power circuit 121 is an electrical sub-circuit of the epitaph device 102. The power circuit 121 provides the electrical power required to operate the epitaph device 102. The power circuit 121 comprises a rechargeable battery 131, a photovoltaic cell 132, and a diode 133. The rechargeable battery 131 is further defined with a first positive terminal 161 and a first negative terminal 171. The photovoltaic cell 132 is further defined with a second positive terminal 162 and a second negative terminal 172.

The rechargeable battery 131 is a commercially available rechargeable battery 131. The chemical energy stored within the rechargeable battery 131 is renewed and restored through the use of the photovoltaic cell 132. The photovoltaic cell 132 is an electrical device that reverses the polarity of the rechargeable battery 131 and provides the energy necessary to reverse the chemical processes that the rechargeable battery 131 initially used to generate the electrical energy. This reversal of the chemical process creates a chemical potential energy that will later be used by the rechargeable battery 131 to generate electricity. The photovoltaic cell 132 receives electrical energy from the sun. The diode 133 is an electrical device that allows current to flow in only one direction. The diode 133 installs between the rechargeable battery 131 and the photovoltaic cell 132 such that electricity will not flow from the first positive terminal 161 of the rechargeable battery 131 into the second positive terminal 162 of the photovoltaic cell 132.

The master switch 122 is a commercially available maintained switch. The master switch 122 controls the flow of electricity from the power circuit 121 such that the master switch 122 is effectively the on/off switch of the invention 100. The applicant anticipates that the use of the master switch 122 will primarily be for maintenance purposes. The master switch 122 is further defined with a first lead 181 and a second lead 182.

The timing device 123 is an electrical sub-circuit of the epitaph device 102. The functions of the timing device 123 are to: a) detect the presence of a visitor to the site; b) initiate the operation of the reliquary 113 circuit 124; and, c) to discontinue the operation of the reliquary 113 circuit 124 after a predetermined period. The timing device 123 comprises a timing circuit 141, a motion sensor 142, an amplifier 143, and a relay 144. The timing circuit 141 is further defined with a trigger lead 147. The amplifier 143 is further defined with an amplifier 143 input 148 and an amplifier 143 output 149.

The timing circuit 141 is a commercially available electrical sub-circuit of the timing device 123. The timing circuit 141 generates a control signal used by the amplifier 143 to energize the relay 144 coil 145 of the relay 144. The timing circuit 141 is triggered by the motion sensor 142 such that the timing circuit 141 maintains the control signal for a predetermined period of time after receiving a signal from the motion sensor 142 through the trigger lead 147 of the timing circuit 141. Methods to use a timing circuit 141 in this fashion are well-known and documented in the electrical arts. In the first potential embodiment of the disclosure, the timing circuit 141 is based on a readily and commercially available "555" timing device 123.

The motion sensor 142 is a commercially available sensor. The motion sensor 142 detects motion in the vicinity of the invention 100. The motion sensor 142 generates an electrical signal that triggers the operation of the timing circuit 141 when motion is detected. The use of a motion sensor 142 is well-known and documented in the electrical arts.

The amplifier 143 amplifies the control signal received from the timing circuit 141. The amplifier 143 amplifies the received control signal such that the relay 144 coil 145 has adequate energy to operate. The amplifier 143 further forms a buffer between the relay 144 coil 145 and the timing circuit 141 such the timing circuit 141 is isolated from electrical spikes generated by the relay 144.

The relay 144 is an electrically controlled and operated switch. The relay 144 is selected from the group consisting of a transistor and a relay 144. Those skilled in the electrical arts will recognize that transistors can substitute for a relay 144 without undue experimentation. The operation of the relay 144 is controlled by the timing circuit 141 and the amplifier 143. The relay 144 is a switching device positioned in series between the master switch 122 and the reliquary 113 circuit 124 such that the relay 144 controls the flow of electricity between the master switch 122 and the reliquary 113 circuit 124. The relay 144 comprises a relay 144 coil 145 and a relay 144 switch 146. The relay 144 coil 145 is further defined with a third lead 183 and a fourth lead 184. The relay 144 switch 146 is further defined with a fifth lead 185 and a sixth lead 186.

The relay 144 coil 145 is the coil of the relay 144. The relay 144 coil 145 is an electromechanical device that physically controls the actuation of the relay 144 switch 146. The relay 144 coil 145 actuates the relay 144 switch 146 based on the amplified control signal provided by the timing circuit 141 through the amplifier 143. The relay 144 switch 146 is a switch. The relay 144 switch 146 is actuated by the relay 144 coil 145. The relay 144 switch 146 controls the operation of the reliquary 113 circuit 124 by controlling the flow of electricity into the reliquary 113 circuit 124. The relay 144, the relay 144 coil 145, and the relay 144 switch 146 are defined in greater detail elsewhere in this disclosure.

The reliquary 113 circuit 124 is an electrical sub-circuit of the epitaph device 102. The functions of the reliquary 113 circuit 124 are to: a) illuminate the one or more relics 191 contained within the reliquary 113; b) initiate an audible presentation appropriate for the function performed by the funerary structure. The reliquary 113 circuit 124 comprises an audio device 151 and a lamp 152.

The audio device 151 is a commercially available electrical device. The audio device 151 generates audible sounds from a previously determined and provided audio file 157. The sounds generated by the audio device 151 are audible from the exterior of the memorial structure 101. The audio device 151 comprises an audio source 153 and a speaker 154. The audio source 153 further comprises an audio file 157.

The audio source 153 is an electrical device. The audio source 153 generates electrical signals that are received by the speaker 154. The speaker 154 is a transducer. The speaker 154 receives the electrical signals generated by the audio source 153 and converts the electrical signal directly into a sound that is audible from the exterior of the memorial structure 101. The audio file 157 is a digital representation of the audible sound that is generated by the audio device 151. The electrical signals generated by the audio source 153 are specified using the audio file 157.

The lamp 152 is an illumination device. The lamp 152 illuminates the one or more relics 191 contained within the reliquary 113. The lamp 152 comprises a plurality of LEDs 155 and a limit resistor 156. Each of the plurality of LEDs 155 are identical. Each of the plurality of LEDs 155 is further defined with a LED anode 158 and a LED cathode 159.

Each of the plurality of LEDs 155 is a two-terminal electrical device. Each of the plurality of LEDs 155 generates illumination used to illuminate the reliquary 113. The use of one or more LEDs for this purpose are well-known and documented in the electrical arts. The limit resistor 156 is a two-terminal electrical device. The limit resistor 156 protects the plurality of LEDs 155 by limiting the flow of electricity through the plurality of LEDs 155.

The following four paragraphs describe the assembly of the epitaph device 102.

The second positive terminal 162 of the photovoltaic cell 132 electrically connects to the anode of the diode 133. The cathode of the diode 133 electrically connects to the first positive terminal 161 of the rechargeable battery 131. The cathode of the diode 133 electrically connects to the first lead 181 of the master switch 122. The second lead 182 of the master switch 122 electrically connects to the energizing circuits of the timing circuit 141. The second lead 182 of the master switch 122 electrically connects to the energizing circuits of the amplifier 143. The second lead 182 of the master switch 122 electrically connects to the fifth lead 185 of the relay 144 switch 146.

The output signal of the motion sensor 142 electrically connects to the trigger lead 147 of the timing circuit 141. The output signal of the timing circuit 141 electrically connects to the amplifier 143 input 148 of the amplifier 143. The amplifier 143 output 149 of the amplifier 143 electrically connects to third lead 183 of the fourth lead 184.

The sixth lead 186 of the relay 144 switch 146 electrically connects to the energizing circuits of the audio source 153. The sixth lead 186 of the relay 144 switch 146 electrically connects to the LED anode 158 of each of the plurality of LEDs 155 such that the plurality of LEDs 155 electrically connect in parallel. The audio source 153 electrically connects to the speaker 154. The limit resistor 156 electrically connects to the LED cathode 159 of each of the plurality of LEDs 155 such that the plurality of LEDs 155 electrically connect in parallel.

The second negative terminal 172 of the photovoltaic cell 132 forms the electrical ground of the system. The second negative terminal 172 of the photovoltaic cell 132 electrically connects to the first negative terminal 171 of the rechargeable battery 131. The second negative terminal 172 of the photovoltaic cell 132 electrically connects to the energizing circuits of the timing circuit 141. The second negative terminal 172 of the photovoltaic cell 132 electrically connects to the energizing circuits of the amplifier 143. The second negative terminal 172 of the photovoltaic cell 132 electrically connects to the relay 144 coil 145 of the relay 144. The second negative terminal 172 of the photovoltaic cell 132 electrically connects to the energizing circuits of the audio source 153. The second negative terminal 172 of the photovoltaic cell 132 electrically connects to the speaker 154. The second negative terminal 172 of the photovoltaic cell 132 electrically connects to the limit resistor 156 such that the limit resistor 156 forms a series connection between the LED cathode 159 of each of the plurality of LEDs 155 and the second negative terminal 172.

The following definitions were used in this disclosure:

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Audio Device: As used in this disclosure, an audio device is a device that generates audible sound waves.

Audio File: As used in this disclosure, an audio file is a digital representation of a sound that is used to store a recording of the sound. Separate hardware is used to convert the digital representation of the sound into an audible sound.

Audio Source: As used in this disclosure, an audio source is a device that generates electrical signals that can be converted into audible sounds by a speaker.

Battery: As used in this disclosure, a battery is a chemical device consisting of one or more cells, in which chemical energy is converted into electricity and used as a source of power. Batteries are commonly defined with a positive terminal and a negative terminal.

Cavity: As used in this disclosure, a cavity is an empty space or negative space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chamber: As used in this disclosure, a chamber is an enclosed or enclosable negative space dedicated to a purpose.

Closed Position: As used in this disclosure, a closed position refers to a movable barrier structure that is in an orientation that prevents passage through a port or an aperture. The closed position is often referred to as an object being "closed." Always use orientation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. Specifically, the surface area of an end of the prism-shaped object that forms the disk is greater than the lateral face of the prism-shaped object that forms the disk. In this disclosure, the ends of the prism-shaped structure that forms the disk are referred to as the faces of the disk.

Door: As used in this disclosure, a door is a movable or removable barrier that is attached to the wall of a room or the surface of a container for the purpose of allowing or preventing access through an aperture into the room or container.

Electrical Ground: As used in this disclosure, an electrical ground is a common reference voltage that is used in the design and implementation of electrical circuits. An electrical ground is often, but not necessarily, the discharge point of electric currents flowing through an electric circuit.

Encomium: As used in this disclosure, an encomium is a written or audible statement of praise.

Field of View: As used in this disclosure, a field of view refers to one or more angles which delimits an area from which electromagnetic radiation will be sensed by a person or an image sensor.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Ground: As used in this disclosure, the ground is a solid supporting surface formed by the Earth. The term level ground means that the supporting surface formed by the ground is roughly perpendicular to the force of gravity. Always use supporting surface.

Lead: As used in this disclosure, a lead is a conductor that is physically used to electrically connect an electrical component into a larger circuit assembly.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a device that prevents the unauthorized entry into a container or chamber.

Maintained Switch: A used in this disclosure, a maintained switch is a switch that maintains the position that was set in the most recent switch actuation. A maintained switch works in an opposite manner to a momentary switch.

Motion Sensor: As used in this disclosure, a motion sensor refers to a commercially available sensor that generates an electrical signal should the motion sensor detect movement within its field of view.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pedestal: As used in this disclosure, a pedestal is an intermediary load-bearing structure that that forms a load path between a supporting surface and an object, structure, or load.

Photovoltaic Cell: As used in this disclosure, a photovoltaic cell is an electrical device that directly converts light energy into electrical energy.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relay: As used in this disclosure, a relay is an automatic electronic, electromagnetic or electromechanical device that reacts to changes in voltage or current by opening or closing a switch in an electric circuit. Within this disclosure, a transistor can be considered a relay. Relays are further defined with a coil and a switch. Applying a voltage to the coil, usually referred to as energizing the coil, will cause the coil to change the position of the switch. The operation of transistors is discussed elsewhere in this disclosure.

Relic: As used in this disclosure, a relic refers to an object that remains after the completion of a prior event.

Reliquary: As used in this disclosure, a reliquary is: a) a room or chamber used to store or display one or more relics; or, b) a container used to store or display one or more relics.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

Speaker: As used in this disclosure, a speaker is an electrical transducer that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Terminal: As used in this disclosure, a terminal is the end point of a conductor. A terminal can be the conducting wire itself or may have attached to is a device designed to facilitate an electrical connection.

Timing Circuit: As used in this disclosure, a timing circuit refers to an electrical network of interconnected electrical elements, potentially including but not limited to, resistors, capacitors, diodes, transistors, and integrated circuit devices. The purpose of the timing circuit is to generate an electrical control signal after a predetermined amount of time. In common usage, a timing circuit is also referred to as timing circuitry. The "555" timing circuit is a well-known, documented, and commercially available timing circuit.

Timing Device: As used in this disclosure, a timing device is an automatic mechanism for activating or deactivating a device at a specific time or after a specific period of time.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Transducer: As used in this disclosure, a transducer is a device that converts a physical quantity, such as pressure or brightness into an electrical signal or a device that converts an electrical signal into a physical quantity.

Transistor: As used in this disclosure, a transistor is a general term for a three-terminal semiconducting electrical device that is used for electrical signal amplification and electrical switching applications. There are several designs of transistors. A common example of a transistor is an NPN transistor that further comprises a collector terminal, an emitter terminal, and a base terminal and which consists of a combination of two rectifying junctions (a diode is an example of a rectifying junction). Current flowing from the collector terminal through the emitter terminal crosses the two rectifier junctions. The amount of the electric current crossing the two rectified junctions is controlled by the amount of electric current that flows through the base terminal. The transistors used in this disclosure operate in either an amplifier mode or a switch mode. In the amplifier mode, when a first current flows into the base, a second current flows from the collector to the emitter. The amount of the second current is a linear function of the first current. In this mode, the transistor acts as an amplifier. The operation of a transistor moves to a switching mode when the first current reaches the saturation levels of the transistor. In the switch mode, when a voltage is applied to the base, current will flow into the base and the transistor will act like a closed switch allowing current to flow from the collector to the emitter. When the voltage is removed from the base, the transistor will act like an open switch disrupting current flow from the collector to the emitter. This disclosure assumes the use of an NPN transistor. This assumption is made solely for the purposes of simplicity and clarity of exposition. Those skilled in the electrical arts will recognize that other types of transistors, including but not limited to, field effect transistors and PNP transistors, can be substituted for an NPN transistor without undue experimentation.

Transparent: As used in this disclosure, transparent refers to a material that allows light to pass through the material without significant scattering such that an object can be clearly seen through the material.

Window: As used in this disclosure, a window is an opening formed in a structure that is fitted with glass or other transparent material in a frame to that allows the passage of light through the structure.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A gravesite marker comprising:
a memorial structure and an epitaph device;
wherein the memorial structure contains the epitaph device;
wherein the memorial structure houses a reliquary;
wherein the epitaph device is an electric circuit;
wherein the gravesite marker is a funerary structure;
wherein the gravesite marker contains the reliquary;
wherein the reliquary stores one or more relics;
wherein the reliquary displays the one or more relics;
wherein the epitaph device detects a person's presence at the gravesite marker;
wherein the epitaph device illuminates the one or more relics contained within the reliquary;
wherein the epitaph device initiates an audible presentation;
wherein the epitaph device extinguishes the illumination of the reliquary after a predetermined period;
wherein the epitaph device terminates the audible presentation after the predetermined period;
wherein the audible presentation is selected from the group consisting of an encomium and music;
wherein the memorial structure comprises a pedestal and a headstone;
wherein the pedestal is a prism-shaped structure;
wherein the headstone is a hollow prism-shaped structure;
wherein the headstone rests on the pedestal such that the pedestal and the headstone forms a composite prism;
wherein the pedestal forms a platform that raises the headstone above a ground;
wherein the headstone is the structure of the memorial structure that contains the epitaph device;
wherein the headstone further comprises the reliquary, a transparent barrier, and a door;
wherein the headstone contains the reliquary;
wherein the transparent barrier and the door attach to the reliquary;
wherein the reliquary is a chamber formed within the headstone;
wherein the reliquary contains the one or more relics for display;
wherein the reliquary further comprises a reliquary cavity;
wherein the reliquary cavity is a negative space formed within the headstone;
wherein the reliquary cavity is a prism-shaped structure;
wherein the interior of the reliquary is visible from the exterior of the headstone;
wherein the transparent barrier is a window formed through the headstone such that the reliquary is viewable from an exterior of the headstone;
wherein the transparent barrier forms a gas impermeable barrier between the exterior of the headstone and the reliquary;
wherein the door is a barrier that encloses the reliquary cavity;
wherein the door controls access into the reliquary cavity;
wherein the door further comprises a lock;
wherein the lock is a mechanical device used to secure the door in a closed position;
wherein the epitaph device comprises a power circuit, a master switch, a timing device, and a reliquary circuit;
wherein the power circuit, the master switch, the timing device, and the reliquary circuit are electrically interconnected;
wherein the power circuit is an electrical sub-circuit of the epitaph device;
wherein the master switch is a maintained switch;
wherein the master switch is further defined with a first lead and a second lead;
wherein the timing device is an electrical sub-circuit of the epitaph device;
wherein the reliquary circuit is an electrical sub-circuit of the epitaph device;
wherein the power circuit provides the electrical power required to operate the epitaph device;
wherein the master switch controls the flow of electricity from the power circuit into the balance of the epitaph device;
wherein the functions of the timing device are to: a) detect the presence of a visitor to the site; b) initiate the operation of the reliquary circuit; and, c) to discontinue the operation of the reliquary circuit after the predetermined period;
wherein the functions of the reliquary circuit are to: a) illuminate the one or more relics contained within the reliquary; b) initiate an audible presentation;
wherein the power circuit comprises a rechargeable battery, a photovoltaic cell, and a diode;
wherein the rechargeable battery, the photovoltaic cell, and the diode are electrically interconnected;
wherein the rechargeable battery is further defined with a first positive terminal and a first negative terminal;
wherein the photovoltaic cell is further defined with a second positive terminal and a second negative terminal.

2. The gravesite marker according to claim 1
wherein the photovoltaic cell is an electrical device;
wherein the photovoltaic cell reverses the polarity of the rechargeable battery;
wherein the diode is an electrical device that allows current to flow in only one direction;
wherein the diode installs between the rechargeable battery and the photovoltaic cell such that electricity will not flow from the first positive terminal of the rechargeable battery into the second positive terminal of the photovoltaic cell.

3. The gravesite marker according to claim 2
wherein the timing device comprises a timing circuit, a motion sensor, an amplifier, and a relay;
wherein the timing circuit, the motion sensor, the amplifier, and the relay are electrically interconnected;
wherein the timing circuit is further defined with a trigger lead;
wherein the amplifier is further defined with an amplifier input and an amplifier output.

4. The gravesite marker according to claim 3
wherein the timing circuit is an electrical sub-circuit of the timing device;
wherein the timing circuit generates a control signal;
wherein the amplifier amplifies the control signal to energize the relay;
wherein the timing circuit is triggered by the motion sensor.

5. The gravesite marker according to claim 4
wherein the motion sensor detects motion in the vicinity of the gravesite marker;
wherein the motion sensor generates an electrical signal that triggers the operation of the timing circuit when motion is detected.

6. The gravesite marker according to claim 5
wherein the amplifier amplifies the control signal received from the timing circuit;
wherein the amplifier amplifies the received control signal such that the relay has adequate energy to operate;
wherein the amplifier further forms a buffer between the relay and the timing circuit such the timing circuit is isolated from electrical spikes generated by the relay.

7. The gravesite marker according to claim 6
wherein the relay is an electrically controlled and operated switch;
wherein the relay is a switching device positioned in series between the master switch and the reliquary circuit such that the relay controls the flow of electricity between the master switch and the reliquary circuit;
wherein the operation of the relay is controlled by the timing circuit and the amplifier.

8. The gravesite marker according to claim 7
wherein the relay comprises a relay coil and a relay switch;
wherein the relay coil is an electromechanical device that physically controls the actuation of the relay switch;
wherein the relay coil is further defined with a third lead and a fourth lead;
wherein the relay switch is further defined with a fifth lead and a sixth lead.

9. The gravesite marker according to claim 8
wherein the relay coil actuates the relay switch based on the amplified control signal provided by the timing circuit through the amplifier;
wherein the amplifier amplifies the received control signal such that the relay coil has adequate energy to operate;
wherein the amplifier further forms a buffer between the relay coil and the timing circuit such the timing circuit is isolated from electrical spikes generated by the relay coil;
wherein the relay switch controls the operation of the reliquary circuit by controlling the flow of electricity into the reliquary circuit.

10. The gravesite marker according to claim 9
wherein the reliquary circuit comprises an audio device and a lamp;
wherein the audio device and the lamp are electrically interconnected;
wherein the audio source further comprises an audio file;
wherein the audio device generates audible sounds from the audio file;
wherein the audible sounds generated by the audio device are audible from the exterior of the memorial structure;
wherein the lamp is an illumination device;
wherein the lamp illuminates the one or more relics contained within the reliquary.

11. The gravesite marker according to claim 10
wherein the audio device comprises an audio source and a speaker;
wherein the audio source generates electrical signals that are received by the speaker;
wherein the speaker is a transducer;
wherein the speaker receives the electrical signals generated by the audio source and converts the electrical signal directly into an audible sound that is audible from the exterior of the memorial structure;
wherein the audio file is a digital representation of the audible sound that is generated by the audio device;
wherein the electrical signals generated by the audio source are specified using the audio file.

12. The gravesite marker according to claim 11
wherein the lamp comprises a plurality of LEDs and a limit resistor;
wherein the plurality of LEDs and the limit resistor are electrically interconnected;
wherein each of the plurality of LEDs are identical;
wherein each of the plurality of LEDs is further defined with a LED anode and a LED cathode;
wherein each of the plurality of LEDs is a two-terminal electrical device;
wherein each of the plurality of LEDs generates illumination;
wherein the limit resistor is a two-terminal electrical device;
wherein the limit resistor limits the flow of electricity through the plurality of LEDs.

13. The gravesite marker according to claim 12
wherein the second positive terminal of the photovoltaic cell electrically connects to the anode of the diode;
wherein the cathode of the diode electrically connects to the first positive terminal of the rechargeable battery;
wherein the cathode of the diode electrically connects to the first lead of the master switch;
wherein the second lead of the master switch electrically connects to the energizing circuits of the timing circuit;
wherein the second lead of the master switch electrically connects to the energizing circuits of the amplifier;
wherein the second lead of the master switch electrically connects to the fifth lead of the relay switch;
wherein the output signal of the motion sensor electrically connects to the trigger lead of the timing circuit;
wherein the output signal of the timing circuit electrically connects to the amplifier input of the amplifier;

wherein the amplifier output of the amplifier electrically connects to the third lead of the fourth lead;

wherein the sixth lead of the relay switch electrically connects to the energizing circuits of the audio source;

wherein the sixth lead of the relay switch electrically connects to the LED anode of each of the plurality of LEDs such that the plurality of LEDs electrically connect in parallel;

wherein the audio source electrically connects to the speaker;

wherein the limit resistor electrically connects to the LED cathode of each of the plurality of LEDs such that the plurality of LEDs electrically connect in parallel;

wherein the second negative terminal of the photovoltaic cell forms the electrical ground of the system;

wherein the second negative terminal of the photovoltaic cell electrically connects to the first negative terminal of the rechargeable battery;

wherein the second negative terminal of the photovoltaic cell electrically connects to the energizing circuits of the timing circuit;

wherein the second negative terminal of the photovoltaic cell electrically connects to the energizing circuits of the amplifier;

wherein the second negative terminal of the photovoltaic cell electrically connects to the relay coil of the relay;

wherein the second negative terminal of the photovoltaic cell electrically connects to the energizing circuits of the audio source;

wherein the second negative terminal of the photovoltaic cell electrically connects to the speaker;

wherein the second negative terminal of the photovoltaic cell electrically connects to the limit resistor such that the limit resistor forms a series connection between the LED cathode of each of the plurality of LEDs and the second negative terminal.

14. The gravesite marker according to claim 13 wherein the relay is selected from the group consisting of a transistor and a relay.

* * * * *